United States Patent
Marquant et al.

(10) Patent No.: US 7,961,785 B2
(45) Date of Patent: Jun. 14, 2011

(54) METHOD FOR ENCODING INTERLACED DIGITAL VIDEO DATA

(75) Inventors: Gwenaelle Marquant, La Chapelle Chaussie (FR); Jerome Vieron, Bedee (FR); Guillaume Boisson, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1221 days.

(21) Appl. No.: 10/592,628

(22) PCT Filed: Feb. 28, 2005

(86) PCT No.: PCT/EP2005/002072
§ 371 (c)(1),
(2), (4) Date: Sep. 12, 2006

(87) PCT Pub. No.: WO2005/096228
PCT Pub. Date: Oct. 13, 2005

(65) Prior Publication Data
US 2008/0232473 A1    Sep. 25, 2008

(30) Foreign Application Priority Data

Mar. 12, 2004  (EP) ..................................... 04290695

(51) Int. Cl.
*H04N 7/12* (2006.01)
(52) U.S. Cl. .............................. 375/240.12; 375/240.16
(58) Field of Classification Search ............ 375/240.12, 375/240.15, 240.16, 240.1, 240.21
See application file for complete search history.

(56) References Cited

U.S. PATENT DOCUMENTS

| | | | |
|---|---|---|---|
| 5,510,840 A | 4/1996 | Yonemitsu et al. | |
| 5,742,343 A * | 4/1998 | Haskell et al. ............ | 375/240.15 |
| 6,510,177 B1 * | 1/2003 | De Bonet et al. ........ | 375/240.16 |
| 6,728,317 B1 * | 4/2004 | Demos ..................... | 375/240.21 |
| 7,599,437 B2 | 10/2009 | Chujoh et al. | |
| 7,616,691 B2 | 11/2009 | Chujoh et al. | |

(Continued)

FOREIGN PATENT DOCUMENTS

CN    1692653 A    11/2005

(Continued)

OTHER PUBLICATIONS

Frank Bosvelt et al., 3D Subband Decompositions for Hierarchical Video Coding, Nov. 11, 2011, P.O. Box 5031, 2006 GA Delf, The Netherlands, pp. 769-780.*

(Continued)

*Primary Examiner* — Gims S Philippe
(74) *Attorney, Agent, or Firm* — Robert D. Shedd; Paul P. Kiel; Brian J. Dorini

(57) ABSTRACT

Interlaced video can be encoded in two layers, base layer and enhancement layer. A method for optimizing the encoding of motion vectors for enhancement layer is proposed. It comprises defining various different ways to encode the motion vectors, estimate the coding costs for each way, and select the way with the lowest coding cost. The various ways to encode enhancement layer motion vectors can be combined. Either motion vectors from base layer are reused, resulting in a scaling factor and an update vector, or new motion vectors are calculated. Either forward or backward or bi-directional prediction can be used. Either one frame or multiple frames can be taken as reference. The reference frame can be from the enhancement layer, base layer or both. Either the complete motion vectors are encoded, or only the difference between the motion vector and the corresponding BL motion vector is encoded.

9 Claims, 3 Drawing Sheets

U.S. PATENT DOCUMENTS

| | | |
|---|---|---|
| 7,885,332 B2 | 2/2011 | Chujoh et al. |
| 7,885,333 B2 | 2/2011 | Chujoh et al. |
| 2004/0258156 A1 | 12/2004 | Chujoh et al. |
| 2006/0039472 A1* | 2/2006 | Barbarien et al. ........ 375/240.16 |
| 2007/0147492 A1* | 6/2007 | Marquant et al. .......... 375/240.1 |
| 2007/0153901 A1 | 7/2007 | Chujoh et al. |
| 2009/0316790 A1 | 12/2009 | Chujoh et al. |
| 2009/0316791 A1 | 12/2009 | Chujoh et al. |
| 2009/0323805 A1 | 12/2009 | Chujoh et al. |
| 2009/0323806 A1 | 12/2009 | Chujoh et al. |
| 2009/0323816 A1 | 12/2009 | Chujoh et al. |
| 2009/0323817 A1 | 12/2009 | Chujoh et al. |
| 2010/0316124 A1* | 12/2010 | Park et al. ................ 375/240.13 |

FOREIGN PATENT DOCUMENTS

| | | |
|---|---|---|
| EP | 0644695 | 3/1995 |
| EP | 0883300 | 12/1998 |
| EP | 1565001 A1 | 8/2005 |

OTHER PUBLICATIONS

Search Report Dated Jul. 13, 2005.

Seung Hwan Kim, et al., "Adaptive Multiple Reference Frame Based Scalable Video Coding Algorithm", IEEE ICIP, 2002, pp. II33-II-36, Image Proc. Lab, Inst. of New Media and Comm., Seoul National University, Korea.

* cited by examiner

METHOD FOR ENCODING INTERLACED DIGITAL VIDEO DATA

This application claims the benefit, under 35 U.S.C. §365 of International Application PCT/EP05/002072, filed Feb. 28, 2005, which was published in accordance with PCT Article 21(2) on Oct. 13, 2005 in English and which claims the benefit of European patent application No. 04290695.8, filed Mar. 12, 2004.

FIELD OF THE INVENTION

This invention relates to a method for video compression. More particularly, it relates to a method for encoding data for interlaced video using motion compensated predictive coding.

BACKGROUND

Various video coding algorithms use motion compensated predictive coding for reduction of transmission bandwidth. This is known as Motion Compensated Temporal Filtering (MCTF). In such hybrid schemes, temporal redundancy is reduced using motion compensation, and spatial redundancy is reduced using motion compensation residual transform coding. Motion compensation includes usage of motion estimation (ME) to generate motion vectors (MV), which are used in order to minimize the amount of data to be transmitted when an object moves its position in one picture relative to another picture. The motion vectors are then encoded and transmitted to the decoder, which can then locate the object in a reference picture and move it according to the motion vectors. Motion estimation uses either forward or backward or bi-directional referencing.

New display types, e.g. miniature mobile displays, get by with progressive video sequences of low spatial and temporal resolution, while others, e.g. HDTV receivers, require interlaced sequences with high spatial resolution and standard temporal resolution. But while most standard definition (SD) video material is interlaced, recent research in scalable video coding has concentrated on evaluation of progressive video. A method for transmission of spatially and temporally scalable, interlaced video that provides a wide range of scalability is described in the European Patent Application EP03290507. It is based on separating a video frame sequence into a base layer (BL) and an enhancement layer (EL).

SUMMARY OF THE INVENTION

Video encoding generally aims at minimizing transmission data rate. For multi-layer approaches for generating spatially and temporally scalable interlaced video, e.g. the described dual layer approach, there may exist further possibilities for redundancy reduction, depending on the actual video sequence. The purpose of the invention is to exploit these possibilities, and thereby improve the efficiency of encoding of interlaced video, and particularly of scalable interlaced video.

A method that is suitable for solving this problem is disclosed in claim 1. An encoder that utilizes the method is disclosed in claim 3.

According to the invention, using a flexible scheme for selecting and encoding the EL motion vectors can further reduce the required amount of bits for encoding, the so-called coding costs. This results in an adaptive approach that enables optimization of the data rate with regard to the actual video sequence.

The inventive method for encoding data for interlaced video comprises the steps of separating video frames into a BL and an EL;

performing motion estimation for the BL frames, referencing BL frames and resulting in first motion vectors;

performing motion estimation for the EL, referencing BL frames, EL frames or combinations thereof and resulting in different sets of second motion vectors;

calculating coding costs for the different sets of second motion vectors, the coding costs corresponding or being equal to the number of bits required for encoding;

estimating a distortion value for each of the different sets of second motion vectors, the distortion value being based on the difference between the enhancement layer frame and a frame that is predicted based on the current set of second motion vectors and the current reference;

selecting the reference and set of second motion vectors that provides the best compromise of low coding costs and low distortion; and transmitting an identifier with the encoded video data stream, the identifier indicating the utilized encoding type. If e.g. for a particular EL frame the optimal encoding is based on forward prediction referencing a single BL frame, an identifier assigned to this combination can be transmitted, so that the decoder is able to recreate the EL frame by applying the motion vectors on the reference frame indicated by the identifier.

The best compromise between low coding costs and low distortion can be found e.g. by assigning weighting factors to the coding cost value and the distortion value, adding the two weighted values and selecting combination with the minimum sum. The weighting factors can in a trivial case be 1, or can be selected e.g. according to experience.

Further, the inventive method may additionally comprise the step of selecting for the motion vectors of each of the different sets of second motion vectors reference motion vectors belonging to the first motion vectors, and calculating a scaling factor and a difference vector, wherein the scaling factors and difference vectors are used for the calculation of the coding costs and the following steps, and/or for subsequent decoding.

An encoder according to the invention uses motion compensated predictive coding and comprises means for separating video frames into base layer frames and enhancement layer frames;

means for performing motion estimation for the base layer frames, referencing base layer frames and resulting in first motion vectors;

means for performing motion estimation for the enhancement layer frames, wherein for a single enhancement layer frame different sets of second motion vectors based on different references are generated, the different references being one or more base layer frames, or one or more enhancement layer frames, or combinations thereof;

means for calculating coding costs for each of the different sets of second motion vectors, the coding costs corresponding or being equal to the number of bits required for encoding the enhancement layer frame;

means for estimating a distortion value for each of the different sets of second motion vectors, the distortion value being based on the difference between the enhancement layer frame and a frame that is predicted based on the current set of second motion vectors and the current reference;

means for storing the estimated coding costs and distortion values corresponding to the different types of motion estimation, wherein each stored coding cost value and distortion value is associated with an identifier for the corresponding set of second motion vectors;

means for comparing the coding costs for the different sets of second motion vectors, selecting the motion vectors that provide the least coding costs and determining the associated motion estimation; and means for transmitting an identifier with the encoded video data stream, the identifier indicating the utilized encoding type.

A decoder for generating interlaced video data comprises means for receiving an identifier, the identifier being associated to a motion vector or motion field and indicating a reference frame for a region of a prediction frame or a complete prediction frame, and means for decoding a prediction frame or a region within a prediction frame based on said identifier and on said motion vector.

One embodiment of the inventive encoder further comprises means for calculating scaling factors and difference vectors between each of the different sets of second motion vectors and the first motion vectors, wherein the difference vectors are used for the calculation of the coding costs and the following steps, and/or for subsequent decoding.

In one embodiment of the invention, the motion estimation for the enhancement layer is initialized with the first motion vectors.

In one embodiment of the invention, the motion estimation for the enhancement layer comprises at least two out of the following possibilities: backward prediction, forward prediction and bi-directional prediction.

In one embodiment of the invention the motion estimation for a frame of the enhancement layer references to a single frame, while in another embodiment it references to a plurality of frames.

Further advantageous embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 backward, forward and bi-directional prediction.

DETAILED DESCRIPTION OF THE INVENTION

Figure 1:
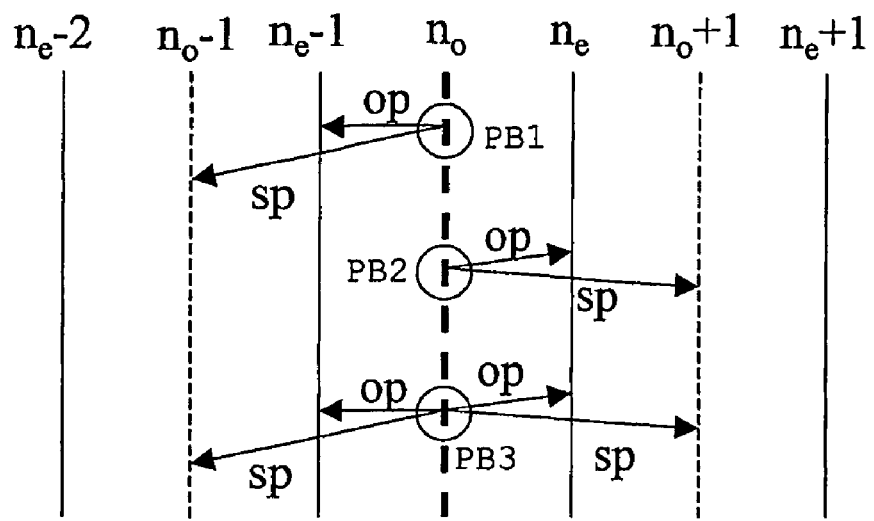

FIG. 1 shows the principle of a first type of different motion prediction modes that can be combined according to the invention. The motion prediction is based on a number of interlaced frames that usually belong to the same group of frames. The frames are divided into odd and even frames. In this example, odd frames belong to the EL and even frames belong to the BL.

A current EL frame $n_o$ being an odd frame contains several pixel blocks PB1, . . . ,PB3. Motion estimation tries to locate for as many as possible of the pixel blocks a reference in one of the neighbor frames, wherein neighbor frames can have the same parity sp as the current frame, or opposite parity op. Therefore there are two neighbor frames in each direction, one in the same layer and one in the other layer. In FIG. 1, for the current odd frame $n_o$ the neighbor frames are: the preceding even frame $n_{e-1}$ from the BL, the preceding odd frame $n_{o-1}$ from the EL, the next even frame $n_e$ from the BL and the next odd frame $n_{o+1}$ from the EL.

The method according to the invention comprises calculation of different types of motion vectors for the blocks of the current frame, estimating the corresponding coding costs and distortion values and selecting the motion vectors with the best coding cost/distortion compromise for encoding. For the first pixel block PB1 of FIG. 1 two possibilities for backward motion estimation are shown, namely either based on the preceding frame of same parity sp or on the preceding frame of opposite parity op. Another pixel block PB2 uses forward motion estimation, with the two possibilities of using the next frame of same parity sp or the next frame of opposite parity as reference. Yet another pixel block PB3 uses bi-directional motion vectors, with four options for any combination of preceding or succeeding frames of same or opposite parity: op-op, sp-op, op-sp and sp-sp. According to the invention, the coding costs for the described combinations are calculated, the corresponding distortion values estimated, and the combination with the best coding cost/distortion compromise is selected for encoding.

Figure 2:
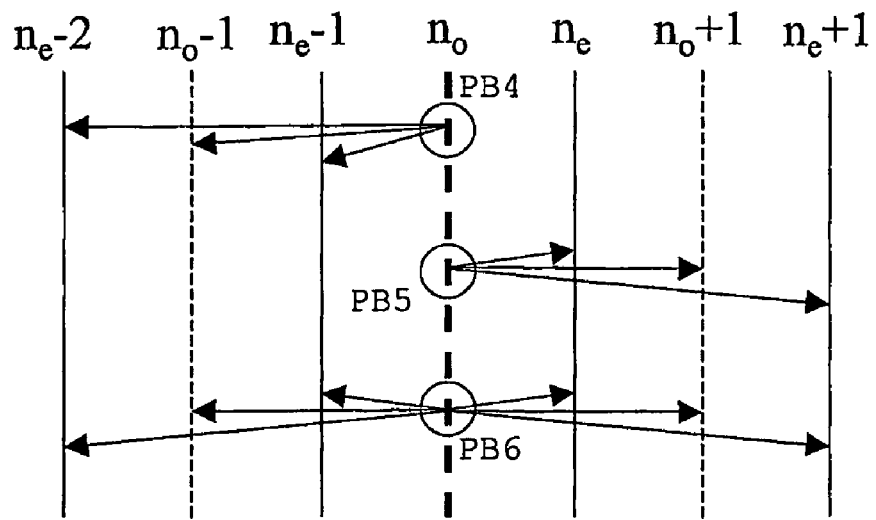
FIG. 2 multiple reference prediction.

Thus, the proposed algorithm makes use of intra/inter layers correlation, i.e. between fields of same or opposite parity. In one embodiment, it is possible to use multiple reference fields to efficiently predict the EL. FIG. 2 shows the principle of a second type of different motion prediction modes that can be combined according to the invention. The motion prediction is based on a defined amount of preceding or succeeding frames, wherein it can use more than one frame at a time. This approach is known as multi-referencing. E.g. a fourth region PB4 of the current odd frame $n_o$ can refer to one or more of the three preceding frames, which are one odd frame $n_{o-1}$ and two even frames $n_{e-2}, n_{e-1}$. Another region PB5 of the current odd frame $n_o$ may refer to one or more of the three following frames, being also one odd frame $n_{o+1}$ and two even frames $n_e$, $n_{e+1}$. A further region PB6 of the current odd frame $n_o$ may refer to one or more of the six neighboring frames, being the three preceding frames and the three following frames mentioned before.

Generally, two distinct concepts for encoding of motion vectors can be used, which are called "a priori" and "a posteriori". "A priori" means that the previous base layer information is exploited: motion vectors are rescaled as initialisation, and a research around this initialisation is performed between surrounding fields. Besides, the coding step benefits from only a residual part of each motion vector has to be transmitted, coupled with the chosen MV, or predictor. "A posteriori" means that the EL motion estimation stage is performed without taking into account the base layer motion information. This latter information may however be used for encoding the EL vectors.

In the "a posteriori" concept, various motion vector prediction modes can be used: backward, forward or bi-directional. The best prediction vector is chosen, either in the same layer field or in the opposite layer field. The choice may be limited to directly contiguous fields, as in FIG. 1. This operation mode can also be "multiple reference", i.e. the vector choice is not limited to contiguous neighbours fields, like in FIG. 2. In addition to the methods illustrated in FIG. 1 and FIG. 2, the re-use of motion vector information from the BL makes it easy to encode only the residual part of each motion vector between BL and EL fields. The advantage of such a solution is the reduction of the MV coding cost.

Figure 3:
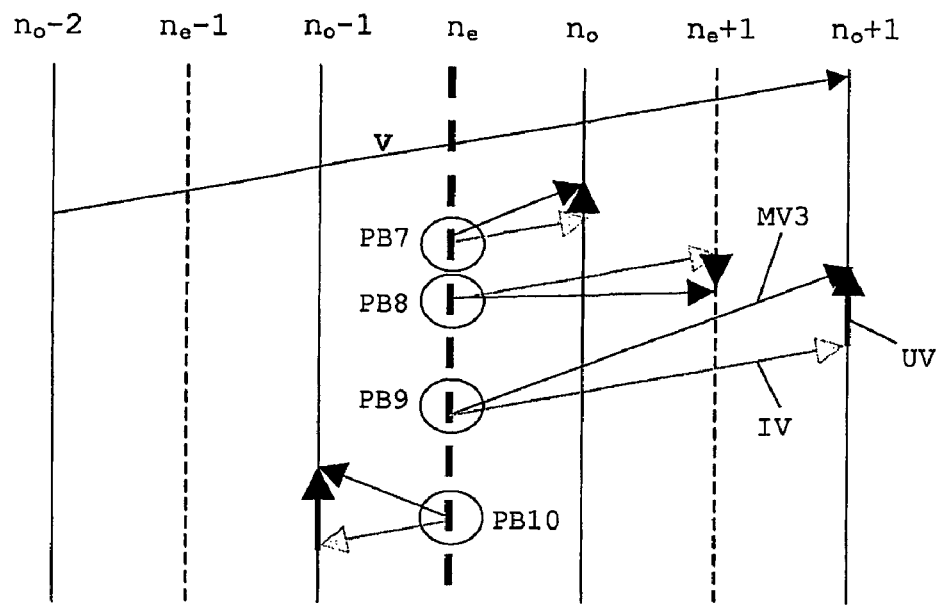
FIG. 3 interpolation of EL MV from BL collocated MV.

In the "a priori" concept, it is assumed that the BL motion vectors are available. In this case they can be used to efficiently initialise the EL motion estimation process. This is shown in FIG. 3. In this example, odd frames $n_{o-2}$, $n_{o-1}$, $n_o$, $n_{o+1}$ are assumed to be used for the base layer. A reference motion vector V belongs to the BL estimation. V permits to propose several potential predictors for the EL among all fields, whatever their parity. A particular predictor i is given by $V_i=\beta_i V$, with $\beta_i \in Q$, Q being the rational numbers set, i.e. $V_i$ and V are collinear. This scaled method can be very similar to the "dual-prime" approach. By coupling this latter method with the "direct mode" it is possible to deduce bi-directional vectors from V, which can be used to construct motion vectors by adding update vectors. Advantageously, it may be more efficient to encode the factor $\beta_i$ and the update vector than using another representation of a MV.

An advantage of the inventive method is that it enables the usage of potentially long filters in the processing of interlaced video material, which is not known in the art. Filtering more than two frames allows higher efficiency in the re-use of motion vectors. E.g. when an object performs a linear motion over several frames, the same reference vector V can be used for all these frames. If the motion is not exactly linear, a reference MV can be used for more efficient encoding, as shown in FIG. 3. When re-using motion vector information V from the BL, it is possible to encode only the residual part of each motion vector between BL and EL fields. The advantage is the reduction of the MV coding cost. In FIG. 3, predictors are interpolated from the BL collocated MV. E.g. at a specific region of the frame the reference motion vector V is calculated between two frames $n_{o-2}$, $n_{o+1}$ of the BL. For different sub-regions within the specific region, initialisation of a predictor is performed by using the collinear value $\beta V$ and adding an update vector to adjust the prediction. Thus, the final MV can be defined by the respective $\beta$ and update vector combination. E.g. for a sub-region PB9 the final motion vector MV3 can be constructed by adding the initial predictor IV and the update vector UV. The performance of the algorithm depends on the quality of the BL motion information: the better BL motion information is, the more effective is the algorithm.

Figure 4:
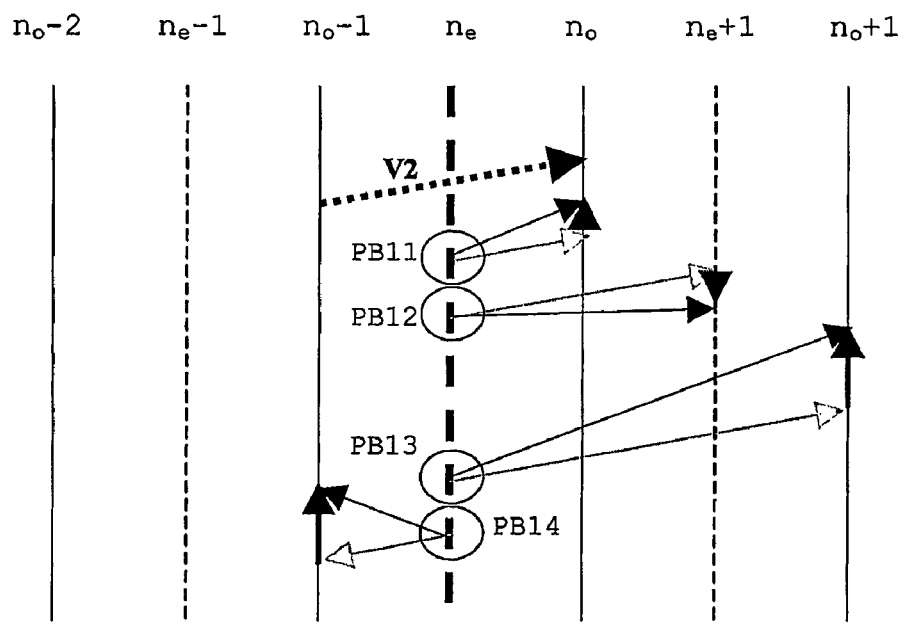
FIG. 4 extrapolation of EL MV from BL collocated MV.

FIG. 4 shows how predictors can be extrapolated from the BL collocated MV. The BL reference vector V2 is in this case calculated between successive BL fields $n_{o-1}$ and $n_o$. It can be used to describe MVs from the EL as a function of a BL MV. Update vectors are used to adjust the prediction.

In one embodiment of the invention, it is also possible to consider the complexity of the calculations in order to minimize the required processing power.

Figure 5:
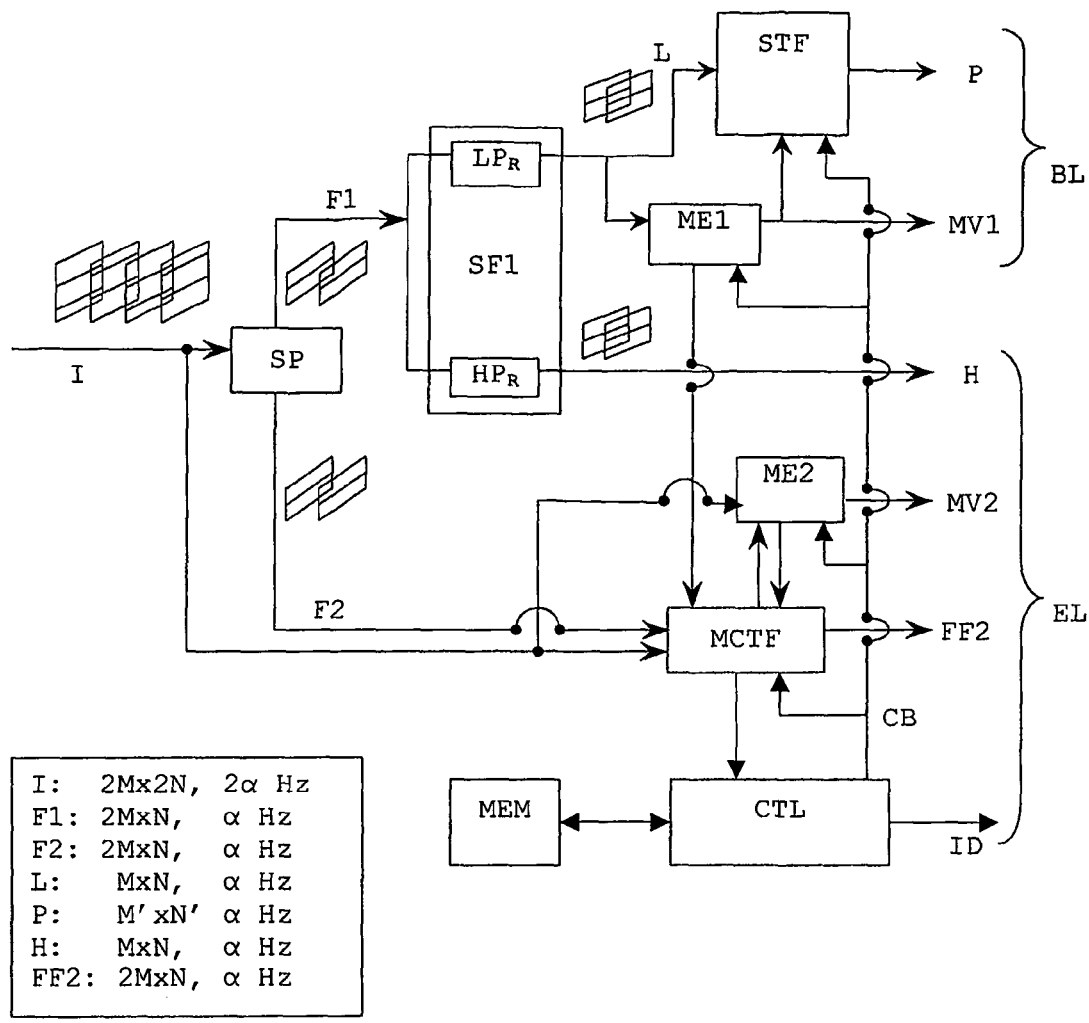
FIG. 5 the structure of an encoder for scalable interlaced video.

FIG. 5 shows the structure of an encoder for scalable interlaced video according to the invention. The input signal I is an interlaced video sequence with a temporal resolution of $2\alpha$ Hz, i.e. $2\alpha$ fields per second or $\alpha$ frames per second, and a spatial resolution of $2M\times 2N$, i.e. a frame having 2N rows with 2M pixels each, or a field having N rows with 2M pixels each. A splitting block SP distributes the sequence such that the fields are passed alternatingly to a first or a second branch F1,F2. The first branch F1 generates BL information and EL information, but will be referred to herein as BL branch. The other branch generates only EL information and will be referred to herein as EL branch. Each of the branches receives a video sequence with a temporal resolution of $\alpha$ frames per second and a spatial resolution of $2M\times N$ pixels. E.g. the BL sequence F1 contains even fields and the EL sequence contains odd fields. The splitting block SP executes a splitting transformation. It may also utilize various filters for more sophisticated processing, e.g. low/high filtering.

The BL branch performs spatial filtering SF1 on the F1 sequence along the x-axis, i.e. within lines, and generates from the lower frequency portions of F1 a video sequence L with a spatial resolution of $M\times N$ pixels, and from the higher frequency portions of F1 a spatial resolution enhancement signal H. In a simple example the filtering can be performed by a low pass filter $LP_R$ and a high pass filter $HP_R$, both performing horizontal subsampling of e.g. factor 2, or another factor. The low-resolution sequence L is input to a spatio-temporal filter STF and to a Motion Estimating (ME) block ME1. The spatio-temporal filter STF performs motion compensated temporal transformation, e.g. 2D+t wavelet transform. It may be implemented e.g. as Haar transform filter of length 2, or Daubechies filter of length 9 and 7, or length 5 and 3. The ME block ME1 generates motion vectors MV1, which serve three purposes: first they are used to optimize the spatio-temporal filtering process, second they are transmitted to the receiver to be used e.g. for the inverse filtering process, and third they will be used in the EL branch of the coder.

The output signal P of the spatio-temporal filter STF is transmitted, and can be combined with the motion vectors MV1 by a receiver to reproduce e.g. an $M\times N$ pixel, $\alpha$ Hz progressive mode video sequence. With the described implementation it is also possible to design the spatio-temporal filter such that this progressive sequence is scalable with respect to temporal resolution and to spatial resolution in both x and y direction. The filter may contain several filtering levels, depending on the target frame rate or format, so that e.g. a spatial resolution of $M'\times N'$ and/or a temporal resolution of $\theta\alpha$ Hz can be achieved, with M' and N' ranging in [0,M] [0,N] and $\theta \in Q_{01}$, $Q_{01}$ being the rational numbers ranging in [0,1]. This filtering can deliver different spatio-temporal frequencies whose fittings, e.g. organization within the data stream, make the base layer fully scalable. The output P of this block STF is a progressive sequence with a resolution of $M'\times N'$, which is a sub-resolution of the original $2M\times 2N$ format, and it represents the lowest spatial and temporal resolution level the inventive system generates.

The spatial resolution enhancement signal H, containing the high frequency fields along the x-axis, belongs to the enhancement layer EL, and can be used by advanced receivers to reconstruct frames with higher spatial resolution in x direction, up to the original resolution.

The EL branch performs MCTF on the F2 sequence. It also uses MVs in order to minimize the amount of data to be transmitted when an object moves its position in one picture relative to another picture, but other than the BL it can use different sets of MVs, as described above, namely MVs generated by comparing fields of same or opposite parity. Advantageously, the MV1 vectors generated in the ME1 block of the BL branch can be used, since it is very likely that the motion between e.g. two successive even fields is very similar to the motion between the two corresponding odd fields, or vice versa. Still it is possible that motion changes within a sequence of four fields, so that it may be advantageous to use better motion vectors MV2, generated from the interlaced sequence I in a second motion estimation block ME2. Therefore a decision block CTL is integrated in the EL branch in order to decide which set of MVs is to be used for MCTF. The decision block CTL evaluates the different MV encoding options for the EL, calculates the respective coding cost, estimates the resulting distortion, weights and adds these values and stores the result for each evaluated option in a memory element MEM. When it has evaluated all allowed options, it selects the option that results in the lowest value, and enables the output of the respective data. Therefore it can control the outputs of the ME blocks ME1,ME2, the MCTF block MCTF and the spatio-temporal filter block STF via a control bus CB. Further, it may transmit an identifier ID for the selected option.

The motion compensated temporal filtering block MCTF makes it possible to generate filtered F2 fields FF2, i.e. F2 fields with lower cost than the original F2 fields. These filtered fields FF2 have the same spatial and temporal resolution as the input F2 fields. Coding cost reduction is achieved by using the described MVs, since the amount of transmitted data is reduced. ME and motion compensation can be performed across fields, independent from parity, in order to capture intra- and inter-fields correlation. Any prediction mode, backward, forward or bi-directional, as well as a multiple reference fields algorithm can be used. In order to reduce MV coding cost and the estimation complexity, motion information from the base layer may be used 'a priori' or 'a posteriori', depending on the targeted requirements.

For transmission, the resulting streams are usually multiplexed into one bitstream. The described encoding method decomposes the interlaced original video sequence in two layers, BL and EL, which allows the resulting bitstream to support a variety of spatial and temporal resolution levels, at the coder side as well as at the decoder side.

The described EL may also be viewed upon as a plurality of layers, since it contains several levels of resolution.

The option of using frames from the other layer is available to the EL, but not to the BL, since the EL data are not available to the BL.

After reception, a decoder can covert the signals to video sequences at different levels of temporal resolution, either progressive or interlaced, and at various levels of spatial resolution. It can utilize the identifier ID to choose for each EL frame, or region within an EL frame, the correct prediction source and MV.

The BL contains a fully scalable description of the input video source in progressive mode, wherein scalability refers to spatial resolution, temporal resolution and quality. The EL, when combined with the BL, allows a low-cost, scalable reconstruction of the original interlaced video material, including the achievement of original spatial resolution, temporal resolution and SNR quality.

Distortion is in video coding commonly understood as a measure of the quality of an encoded picture compared to the source picture. It can be estimated using objective criteria, e.g. the sum of square differences, the sum of absolute differences etc. It can be estimated on intermediate pictures, before having effectively computed the encoded and decoded picture.

The inventive method can be applied to all video encoding schemes with motion vectors on different quality layers.

The invention claimed is:

1. A method for encoding data for interlaced video using motion compensated predictive coding, wherein video frames are separated into base layer frames and enhancement layer frames, the method comprising the steps of
performing motion estimation for the base layer frames, wherein base layer frames are referenced, resulting in first motion vectors;
performing motion estimation for the enhancement layer frames,
wherein for a single enhancement layer frame different sets of second motion vectors based on different references are generated,
the different references being one or more base layer frames, or one or more enhancement layer frames, or combinations thereof;
calculating coding costs for each of the different sets of second motion vectors, the coding costs corresponding or being equal to the number of bits required for encoding the enhancement layer frame;
estimating a distortion value for each of the different sets of second motion vectors, the distortion value being based on the difference between the enhancement layer frame and a frame that is predicted based on the current set of second motion vectors and the current reference;
selecting the reference and set of second motion vectors that provides the best compromise of low coding costs and low distortion, wherein the best compromise is determined by assigning weighting factors to the coding cost value and the distortion value, adding the two weighted values and selecting the combination with the minimum sum; and
transmitting an identifier for the selected reference.

2. Method according to claim 1, further comprising the step of selecting for the motion vectors of each of the different sets of second motion vectors reference motion vectors belonging to the first motion vectors, and calculating a scaling factor and a difference vector, wherein the scaling factors and difference vectors are used for the calculation of the coding costs and the following steps.

3. Method according to claim 1, wherein the motion estimation for the enhancement layer is initialized with the first motion vectors.

4. Method according to claim 1, wherein the motion estimation for the enhancement layer comprises at least two out of the following: backward prediction, forward prediction and bi-directional prediction.

5. Method according to claim 1, wherein the motion estimation for a frame of the enhancement layer may reference to a single frame or to a plurality of frames.

6. Encoder for interlaced video data, the encoder using motion
compensated predictive coding and comprising
means for separating video frames into base layer frames and enhancement layer frames;
means for performing motion estimation for the base layer frames, referencing only base layer frames and resulting in first motion vectors;
means for performing motion estimation for the enhancement layer frames, wherein for a single enhancement layer frame different sets of second motion vectors based on different references are generated, the different references being one or more base layer frames, or one or more enhancement layer frames, or combinations thereof;
means for calculating coding costs for each of the different sets of second motion vectors, the coding costs corresponding or being equal to the number of bits required for encoding the enhancement layer frame;
means for estimating a distortion value for each of the different sets of second motion vectors, the distortion value being based on the difference between the enhancement layer frame and a frame that is predicted based on the current set of second motion vectors and the current reference;
means for storing the estimated coding costs and distortion values corresponding to the different types of motion estimation, wherein each stored coding cost value and distortion value is associated with an identifier for the corresponding set of second motion vectors;
means for comparing the coding costs for the different sets of second motion vectors, selecting the motion vectors that provide the least coding costs and determining the associated motion estimation; and means for transmitting an identifier with the encoded video data stream, the identifier indicating the utilized encoding type.

7. Encoder according to claim 6, further comprising means for calculating scaling factors and difference vectors between each of the different sets of second motion vectors and the first motion vectors, wherein the difference vectors are used for the calculation of the coding costs and the following steps.

8. Encoder according to claim 6, wherein the motion estimation for the enhancement layer is initialized with the first motion vectors.

9. Encoder according to claim 6, wherein the motion estimation for a frame of the enhancement layer may reference to a single frame or to a plurality of frames.

* * * * *